United States Patent [19]

Block et al.

[11] Patent Number: 4,718,629
[45] Date of Patent: Jan. 12, 1988

[54] VACUUM HOLDING DEVICE

[75] Inventors: Dieter Block, Kiel; Hans Penza, Preetz, both of Fed. Rep. of Germany

[73] Assignee: Dr. Ing. Rudolf Hell GmbH, Fed. Rep. of Germany

[21] Appl. No.: 873,713

[22] Filed: Jun. 12, 1986

[30] Foreign Application Priority Data

Jun. 26, 1985 [DE] Fed. Rep. of Germany ....... 3522829
Aug. 3, 1985 [DE] Fed. Rep. of Germany ....... 3527937

[51] Int. Cl.$^4$ .................................. A45D 42/14
[52] U.S. Cl. ......................................... 248/363
[58] Field of Search ............. 248/362, 363, 205.5; 269/21; 294/64.1; 51/235; 279/3; 137/843, 517, 907

[56] References Cited

U.S. PATENT DOCUMENTS

| 1,630,614 | 5/1927 | Hifner ............................ 137/907 |
| 2,526,331 | 10/1950 | Copping ......................... 137/843 |
| 2,694,337 | 11/1954 | Anander . | 
| 2,753,181 | 7/1956 | Anander ........................ 248/363 |
| 3,197,170 | 7/1965 | Schutt .......................... 248/363 |
| 3,247,866 | 4/1966 | Sanz ............................. 137/843 |
| 3,307,816 | 3/1967 | Cocito . |
| 3,307,817 | 3/1967 | Cocito . |
| 3,307,819 | 3/1967 | Cocito ......................... 248/363 |
| 3,889,710 | 6/1975 | Brost ........................... 137/843 |
| 3,907,268 | 9/1975 | Hale . |
| 4,046,011 | 9/1977 | Olsen ........................... 137/843 |
| 4,221,356 | 9/1980 | Fortune ......................... 248/363 |

FOREIGN PATENT DOCUMENTS 1164224 2/1964 Fed. Rep. of Germany .
2513769 7/1983 Fed. Rep. of Germany .

*Primary Examiner*—J. Franklin Foss
*Assistant Examiner*—Robert A. Olson
*Attorney, Agent, or Firm*—Hill, Van Santen, Steadman & Simpson

[57] ABSTRACT

A holding device using a vacuum clamp arrangement has a suction box closed by a suction plate having a holding surface provided with a plurality of suction bores extending from the holding surface into the suction box. Each of the suction bores has an enlarged expanded bore portion inwardly spaced from the holding surface to form a valve chamber which valve chamber is closed by an inner section of the suction bore between the chamber and the suction box and each of the valve chambers loosely receives the shaped valve reed which will close the inner section of the suction bore for each of the suction bore arrangements which is not covered by the sheet placed on the holding surface. This simple structure keeps vacuum losses low and, therefore, enables utilizing a relatively small vacuum pump for the device.

9 Claims, 4 Drawing Figures

VACUUM HOLDING DEVICE

BACKGROUND OF THE INVENTION

The present invention is directed to a device for holding a sheet of material by means of a vacuum, in particular for holding films, foils, plates and the like.

A task of holding a sheet of material, such as films, foils and the like, on a drum rotating at high speed or, in other instances, on planer or curved plates, will occur in many fields of technology, particularly in the field of reproduction technology. When the holding device is provided with a plurality of suction bores, then a vacuum is suitable to provide a clamping means for holding the sheet of material onto the holding element or device.

A great variety of film formats occurs, however, in reproduction technology. Even film pieces having contours, which are completely irregular in shape, must often be clamped in the holding device. When those suction bores that are not covered by the film or sheet are simply left open, then extremely high powered vacuum pumps and high leakage losses through the uncovered bores must be accepted in order to also reliably hold a sheet which has a small, irregular shaped format.

Because considerable centrifugal forces oppose the retaining force in a drum scanner rotating at high speeds, this type of vacuum clamping of the films is not reliable enough especially for vacuum clamp cylinders.

German AS No. 1,164,224 discloses a vacuum clamp device, which has only specific zones of suction holes that can be activated on the basis of valves or cocks and appropriately laid out channels. This device, however, remains limited to a few standard formats and fails given originals having irregularly shaped contours. In addition, this device is very expensive to manufacture, especially when one wishes to employ them in the clamping cylinders. They also do not work automatically but must be manually pre-adjusted.

U.S. Pat. Nos. 3,307,816 and 3,307,817 each disclose vacuum clamp devices, wherein partly spring-loaded, spherical shaped or piston shaped valve bodies close suction bores that are not covered by the original. Also disclosed in the patents are porous inserts which are provided in the suction bores, which merely reduce the leakage rate by means of throttling the flow through the exposed bore.

Apart from the expensive and complicated manufacture as well as the risk of failure due to slight contamination, such elements, moreover, do not reliably close the valve spaces of the suction bores due to the high centrifugal forces in drum scanners rotating at high speeds. In such a case, the vacuum can easily collapse during the scanning procedure. With a collapsed vacuum, the original will fly off the rotating cylinder and can damage the apparatus or even be destroyed.

U.S. Pat. No. 2,694,337 discloses a suction plate which has a plurality of leaf spring valves that are automatically closed due to the air flow. These leaf spring valves are rigidly attached with screws at a defined distance from the bore to be closed and are attached in recesses of the suction plate which is complicated and hard to manufacture. For example, the leaf spring valves are not freely mobile. The manufacture of such suction plates is extremely involved and expensive.

SUMMARY OF THE INVENTION

The object of the present invention is to provide a holding device with a vacuum clamp means for sheets of material, such as films and the like, wherein a freely mobile valve reed, that can be easily and inexpensive to manufacture, automatically closes the suction bore that is not covered by the sheet of material. This improvement can be utilized in a holding device, which utilizes a planer vacuum plates, or curved vacuum plates, which can be either concavely or convexly curved. In addition, the holding device can be used in a vacuum clamp cylinder which is utilized in high speed rotating drum scanners whose interiors are charged with a vacuum.

To achieve these objects, the present invention is directed to an improvement in a device for clamping a sheet of material by means of a vacuum, said device having a sole suction plate, fashioned block-like, comprises a plurality of suction bores which expand to cylindrical valve chambers at a distance spaced inward from a holding surface of the holding device. The improvements are that a dish shaped valve reed is mobilely received in each of the valve chambers and that the valve chambers are in communication with a suction box via a second bore whose cross sectional dimension is such that it will be covered by the mobile valve reed.

The suction plate of the present invention can be fashioned as a cylinder whose outer surface represents the clamping face. It can be fashioned as a curved surface which is either convexly curved or concavely curved. The valve reeds are manufactured of thin, resilient material and they are fashioned to be slightly arcuate with a convex side facing towards the part to be clamped.

DESCRIPTION OF THE PREFERRED EMBODIMENTS

Figure 1:
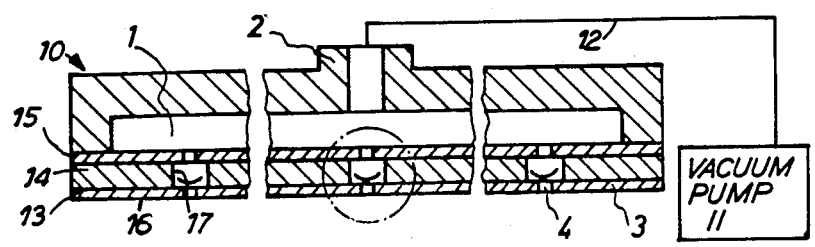
FIG. 1 is a cross sectional view of a suction plate in accordance with the present invention.
Figure 2:
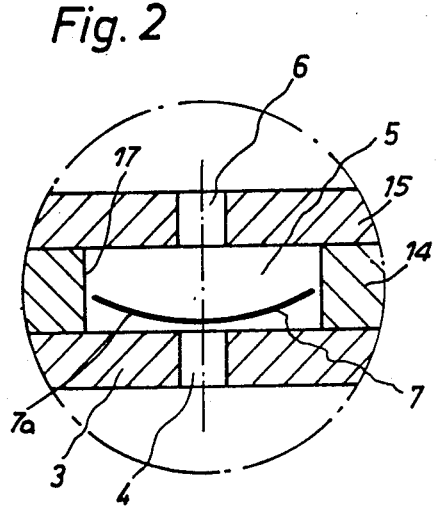
FIG. 2 is an enlarged cross sectional view of a suction hole of the suction plate of FIG. 1 with the reed valve in an open position.

The principles of the present invention are particularly useful when incorporated in a holding device generally indicated at 10. The device 10 includes a suction box 1, which has a connector 2 connected to a vacuum pump 11, as schematically illustrated by a line 12. The suction box 1 is closed opposite the connector 2 by a sole plate 3, which has a plurality of bores 4 extending therethrough. As illustrated, the sole plate 3 is formed by a lamination of three plates 13, 14 and 15 with the outer plate 13 having the bores 4 and the holding surface 16, the middle plate 14, as best illustrated in FIG. 2, having an enlarged bore 17, which is aligned with each of the bores 4 to form a cylindrical valve chamber 5. The inner plate 15 has a second bore 6, which has a small width that is illustrated as being approximately the same area as the bore 4. In each of the valve chambers 5, a small reed valve 7 is received and is freely mobile within the chamber. These reed valves are manufactured from an extremely thin, resilient material, for instance a spring steel band, and are preferably slightly arcuate so that they are part of a curved cylindrical surface. They are positioned in the valve chamber 5 with their convex surface 7a facing the bore 4.

Figure 3:
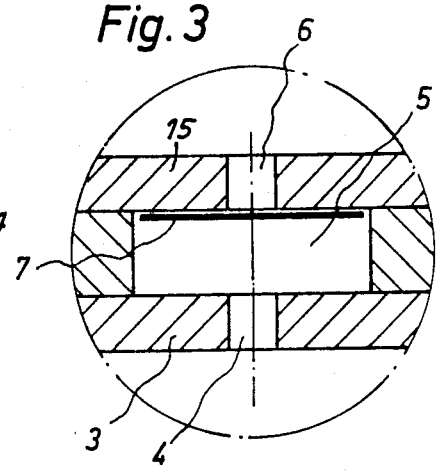
FIG. 3 is an enlarged cross sectional view of a suction hole of the plate of FIG. 1 with the reed valve in a closed position.

When a vacuum from the vacuum pump 11 is applied to the connector 2, the flow of air entering into the bore 4 will move or shift the valve reed 7 in all suction bores that are not covered by a plate or sheet to by clamped so that they will be engaged on the sheet 15 containing the bores 6. As they engage on the sheet 15, as illustrated in FIG. 3, they will tend to be flattened and become planerly seated to close off the bore 6. However, since no air stream enters into the suction bores 4, which are covered by the plate or sheet to be clamped on the surface 16, the valve springs 7 will not be moved tightly against the sheet or plate 15 and the vacuum can penetrate into the valve chamber 5 due to the arc of the valve reed 7. Thus, the vacuum can act on the sheet, which covers the opening 4, for that particular location. After the vacuum has been turned off and the suction box 1 has been aerated, such as by being connected to atmospheric pressure, the spring tension of the valve reed 7 sees to it that they are released from the bores 6 and drop back into their original position, such as illustrated in FIG. 2.

Practice has shown that all valve reeds initially close, even when the vacuum is turned on, without a film or the like being present. When a film or the like having an arbitrary contour is then placed against the surface 16 of the plate, then a slight leakage rate, that is always present between each valve reed 7 and the bores 6 due to burrs or surface roughness, is apparently enough to allow a vacuum to penetrate into the valve chamber 5 and, eventually, to the bores 4. As a consequence, the vacuum that penetrates into each of the chambers 5 will act via the bores 4 on the sheet to be clamped on the surface 16 and hold the sheet onto the surface 16 of the outer plate 13 forming the sole plate 3.

Unclamping, the line to the vacuum pump is closed and the suction box is aerated. The leakage rate between the reeds 7 and the bores 6 that is always present, although slight, sees to a rapid pressure equalization in the relatively small valve chamber 5. The pre-stressing of each of the valve reeds 7 will promote this process.

Figure 4:
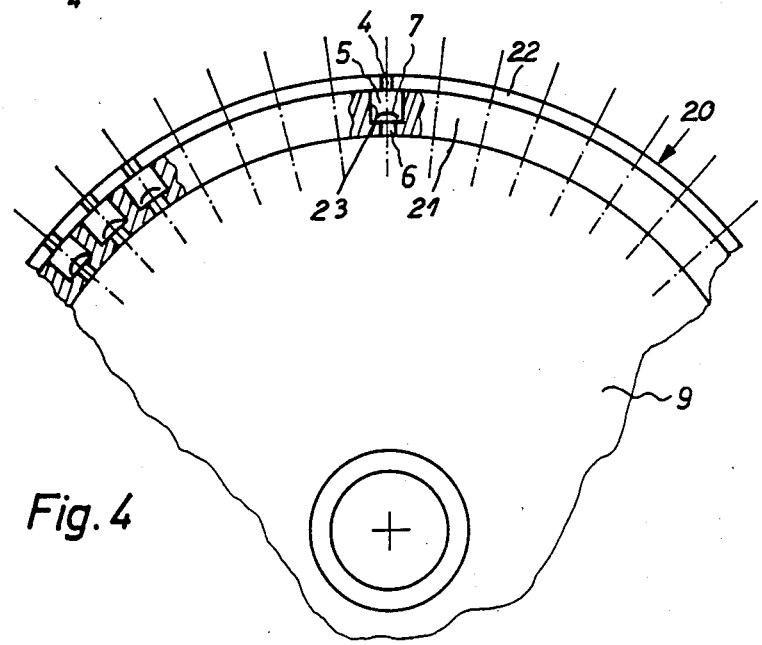
FIG. 4 is a partial end view with portions broken away of a clamping cylinder comprising the vacuum clamp holding device of the present invention.

The above described valve element utlizing the valve reed 7 in a valve chamber 5 can also be used in a curved suction plate or film clamping cylinder of a drum scanner generally indicated at 20 in FIG. 4. A portion of a cylinder of the scanner 20 has an axial chamber 9 connected to a vacuum through a hollow shaft of its bearings in the scanner, and the chamber 9 can be aerated through this shaft when a sheet is to be released from the drum scanner. The outer surface of the cylinder is illustrated as being formed of two cylindrical layers 21 and 22 with the inner layer 21 having both the bores 6 and the enlarged bores 23 to form the valve chamber 5. The outer cylinder or sheet 22 has the bores to form the bore 4 which are aligned with the axes of the bore 6 on a radius of the cylinder.

The present invention can advantageously be utilized in the field of reproduction technology, namely for clamping originals, films, foils and the like, by means of a suction holes that are present on a seating or holding surface. The invention leads to a saving in the apparatus cost in a simple way and can be used everywhere that a clamping of a sheet-like material is obtained by utilizing a vacuum clamp arrangement.

Although various minor modifications may be suggested by those versed in the art, it should be understood that we wish to embody within the scope of the patent granted hereon, all such modifications as reasonably and properly come within the scope of our contribution to the art.

We claim:

1. In a device for clamping a sheet of material, said device having a suction box provided with a sole of a suction plate, said sole having a holding surface and being provided with a plurality of suction bores each of which expands into a cylindrical valve chamber as it approaches the suction box, the improvements comprising a second plate closing all of the valve chambers and having a plurality of second bores, each second bore being substantially the same size as a suction bore and being aligned with a suction bore, each of the valve chambers receiving a freely mobile valve reed for movement within the valve chamber, each valve reed having a slight arcuate configuration to produce a cylindrical convex surface.

2. In a device according to claim 1, wherein the suction plate is constructed as a cylinder whose outer surface represents the holding surface.

3. In a device according to claim 2, wherein each of the valve reeds is manufactured of thin, resilient material, each of said valve reeds being positioned in the chamber with the convex surface facing towards the plate forming the holding surface.

4. In a device according to claim 1, wherein each of the valve reeds is manufactured of a thin, resilient material, each of said reeds being positioned in the chamber with the convex surface facing towards the holding surface of the suction box.

5. In a device according to claim 1, wherein the suction plate has a convexly curved shape.

6. A device according to claim 5, wherein each of the valve reeds is made of a thin, resilient material and said reed being positioned in the valve chamber with the convex surface facing towards the holding surface of the convexly curved suction plate.

7. A device according to claim 1, wherein the suction plate has a concavely curved holding surface.

8. A device according to claim 7, wherein each of the valve reeds is a thin, resilient material said reed being positioned in the valve chamber with the convex surface facing towards the suction bore extending to the holding surface.

9. In a device for clamping a sheet of material, said device having a suction box provided with a sole of a suction plate, said sole having a holding surface and being provided with a plurality of suction bores each of which expands into a cylindrical valve chamber as it approaches the suction box, the improvements comprising said suction plate having a plurality of second bores for closing each of the valve chambers and aligned with the suction bores, each second bore having substantially the same size as a suction bore, and each of the valve chambers receiving a freely mobile valve member for movement within the valve chamber, each valve member being a thin valve reed having a slight arcuate configuration to produce a cylindrical convex surface.

* * * * *